F. L. LATHROP & H. E. CHASE.
TRAVERSE RING.
APPLICATION FILED MAY 24, 1909.
938,773.
Patented Nov. 2, 1909.
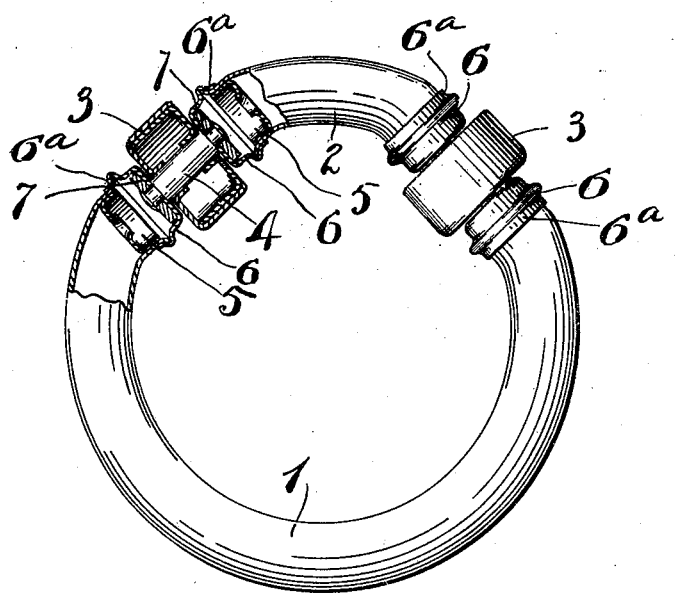
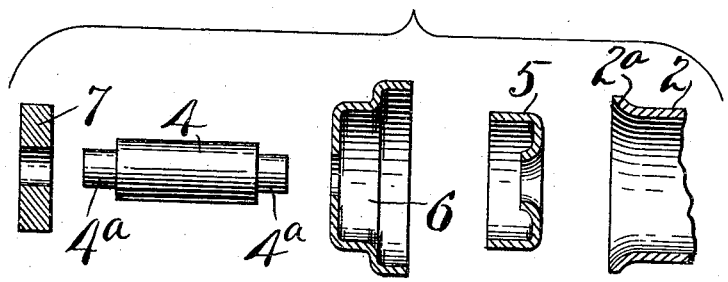
Witnesses:
Inventors: F. L. Lathrop
H. E. Chase
By their Attorneys

UNITED STATES PATENT OFFICE.

FRANK L. LATHROP AND HENRY E. CHASE, OF WALLINGFORD, CONNECTICUT, ASSIGNORS TO H. L. JUDD COMPANY, OF WALLINGFORD, CONNECTICUT, A CORPORATION OF NEW YORK.

TRAVERSE-RING.

938,773.      Specification of Letters Patent.      Patented Nov. 2, 1909.

Application filed May 24, 1909. Serial No. 498,015.

*To all whom it may concern:*

Be it known that we, FRANK L. LATHROP and HENRY E. CHASE, citizens of the United States, residing at Wallingford, county of New Haven, State of Connecticut, have invented certain new and useful Improvements in Traverse-Rings, of which the following is a full, clear, and exact description.

This invention relates to improvements in traverse rings and the like, the object being to provide a simple and effective construction which shall be light and yet very durable.

The invention relates particularly to socalled anti-friction traverse rolls, said articles being provided with anti-friction rollers to permit the ring to travel freely upon the rod support.

In the drawings, Figure 1 is a relatively enlarged elevation (partly in section) of our improved ring. Fig. 2 is a still further enlarged view of several details of construction, all but one of these details being shown in section. Fig. 3 is a section of a modification of a certain detail.

1 is the main body of the ring, the same being of C-shaped outline and of tubular form. The gap between the ends of the section 1 is bridged by a second tubular section 2, there being mounted between the ends of both the sections 1 and 2, the antifriction devices 3—3. The form of these anti-friction devices is immaterial, the ordinary sheet metal wheel being provided in this instance. The invention resides mainly in the method of connecting the ends of the sections 1 and 2 so as to make a strong ring and at the same time furnish a space for the anti-friction devices 3—3 and a suitable mounting therefor. The mounting for each anti-friction device comprises a plain shaft 4 connected at each end with a suitable head, which latter furnishes the connecting means between said shaft and the adjacent ends of the two tubular sections. The various parts of these connecting heads are illustrated separately in detail in Fig. 2. As will be seen in this figure, the end of the tubular section 2 is flanged outwardly slightly as at $2^a$.

5 is an internal reinforcement preferably formed of sheet metal struck into the shape of a cup. This piece is arranged to fit closely within the end of the section 2 to stiffen the same. If desired, the edge of this reinforcing device 5 may be flanged out, as shown at $5^a$ (Fig. 3) whereby the flanged end of the tubular member 2 will be reinforced directly up to its extreme edge.

6 is what we term a coupling member of cup-shaped form and stepped internally as to its diameter. The larger end of the coupling is arranged to slip over the flanged end $2^a$ of the section 2 while the smaller diameter receives a washer 7. The ends of the shaft 4 are turned down as at $4^a$ from shoulders to receive the washers 7. The main body of each shaft 4 is of such a length as to afford a proper spacing for its antifriction device 3, so that the latter may turn freely when in place.

The parts thus far described may be assembled as shown in the sectional portion of Fig. 1. As will be seen, the heads at the opposite ends of the anti-friction roll 3 may be readily applied to the shaft 4 by riveting the reduced cords of the latter. Then the tubular sections 1 and 2 are applied, after which the edge of the coupling 6 is turned down, as at $6^a$, so as to bind firmly upon the ends of both sections 1 and 2, and rigidly connect all the parts in the form of a ring as shown in Fig. 1. We have found that this form of construction may be very cheaply produced without sacrifice of strength or durability.

By the arrangement afforded, a ring of graceful appearance and proportion is made and an effective and durable bearing support for each anti-friction device is provided.

While, of course, the parts may be varied in proportion and design, it should be understood that substantially the form shown in the drawing possesses many advantages and is decidedly preferable to any radical modification such as might be within the scope and spirit of this invention.

What we claim is:

1. In a curtain ring, two tubular ring sections, means for connecting the ends of said sections, said means including a bearing shaft projecting from one section, means for connecting said shaft to the other section, said means including a shouldered abutment on said shaft, a cupped coupling mounted on said shaft and held against said shouldered portion, a reinforcing washer within said cupped coupling and mounted on said shaft, the extremity of said shaft being upset to hold said washer in place, an outward flange on the end of the ring section adjacent said cupped coupling, a reinforcement within said flanged end of said ring section, the outer edge of said cupped coupling being drawn in to rigidly embrace said flanged end, and an anti-friction device mounted on said shaft.

2. In a curtain ring, two tubular ring sections, means for connecting the ends of said sections to form a ring, including a bearing shaft, an anti-friction device mounted thereon for rotation, each end of each ring section being flanged outwardly, a reinforcement within each of said flanged ends to resist crushing strain, a shoulder on each end of each shaft, a coupling cup secured upon each end of each shaft, means for holding said coupling cup in place, a portion of said coupling cup extending around and rigidly embracing the adjacent flanged end of one of the ring sections.

3. In a curtain ring, two tubular ring sections, means for connecting the ends of said sections to form a ring, including a bearing shaft, an anti-friction device mounted thereon for rotation, each end of each bearing shaft being reduced in diameter to form a shoulder, a cupped coupling mounted upon the reduced end of each shaft, a washer mounted upon each reduced shaft end inside of the coupling cup thereon, said washer being secured to said shaft to rigidly hold said cupped coupling thereon, a shoulder intermediate the length of said cupped coupling, said shoulder being formed by flanging said cupped coupling outwardly, each end of each ring section being flanged outwardly to fit within the outer end of an adjacent coupling cup and bearing against the shoulder therein, the extreme edge of each coupling cup being clenched down around the flange of the adjacent ring section to rigidly connect the parts.

4. In a curtain ring, two tubular ring sections, means for connecting one section to the other, including a bearing shaft for an anti-friction device, a cupped coupling mounted upon one end of said shaft, and means for rigidly connecting the same thereon, a shoulder within said cupped coupling formed by flanging said coupling outwardly, an outwardly directed flange on the end of the adjacent tubular section, said flange resting against said shoulder, the extreme edge of said cupped coupling being forced into intimate contact with the external wall of said section to rigidly connect said shaft end and tubular section end.

5. In a curtain ring, two tubular ring sections, means for connecting one section to the other, including a bearing shaft for an anti-friction device, a cupped coupling mounted upon one end of said shaft, and means for rigidly connecting the same thereon, a shoulder within said cupped coupling formed by flanging said coupling outwardly, an outwardly directed flange on the end of the adjacent tubular section, said flange resting against said shoulder, the extreme edge of said cupped coupling being forced into intimate contact with the external wall of said section to rigidly connect said shaft end and tubular section end, and a reinforcement within the end of the tubular section to resist crushing strain.

6. In a curtain ring, two tubular ring sections, means for connecting one section to the other, including a bearing shaft for an anti-friction device, a cupped coupling mounted upon one end of said shaft, and means for rigidly connecting the same thereon, a shoulder within said cupped coupling formed by flanging said coupling outwardly, an outwardly directed flange on the end of the adjacent tubular section, said flange resting against said shoulder, the extreme edge of said cupped coupling being forced into intimate contact with the external wall of said section to rigidly connect said shaft end and tubular section end, and a cupped reinforcement within said end of said tubular section to resist crushing strain.

7. In a curtain ring, two tubular ring sections, means for connecting one section to the other, including a bearing shaft for an anti-friction device, a cupped coupling mounted upon one end of said shaft, and means for rigidly connecting the same thereon, a shoulder within said cupped coupling formed by flanging said coupling outwardly, an outwardly directed flange resting against one shoulder, the extreme edge of said cupped coupling being forced into intimate contact with the external wall of said section to rigidly connect said shaft end and tubular section end, and a reinforcement internally located at the end of said tubular section, said reinforcement being shaped to reinforce said end to the end of the flanged portion thereof.

8. In a curtain ring, two tubular ring sections, means for connecting one section to the other, including a bearing shaft for an anti-friction device, a cupped coupling mounted upon one end of said shaft, and means for rigidly connecting the same thereon, a shoulder within said cupped coupling formed by flanging said coupling outwardly, an outwardly directed flange on the end of the adjacent tubular section, said flange resting against said shoulder, the extreme edge of said cupped coupling being forced into intimate contact with the external wall of said section to rigidly connect said shaft end and tubular section end, and an outwardly faced cupped reinforcement within said tubular section, said cupped reinforcement being flanged to correspond with the flange at the end of said tubular section to reinforce the latter against crushing strain.

FRANK L. LATHROP.
HENRY E. CHASE.

Witnesses:
GEO. W. BAURMAN,
W. L. THORPE.